Patented July 15, 1952

2,603,598

UNITED STATES PATENT OFFICE 2,603,598

CONTROLLING ALKALINITY OF DRILLING FLUIDS

Victor G. Meadors, Tulsa, Okla., assignor to Standard Oil Development Company, a corporation of Delaware No Drawing. Application April 1, 1950, Serial No. 153,490

7 Claims. (Cl. 252—8.5)

1

The present invention relates to the treatment of drilling muds employed in the drilling of oil and gas wells. More specifically it concerns the use of particular addition agents for controlling the alkalinity of aqueous drilling muds.

In the drilling of oil and gas wells, particularly with rotary drilling apparatus, it is common practice to circulate around the drill in bore hole a fluid known as a drilling mud which serves a number of functions, including carrying the bit cuttings out of the bore hole, lubricating the drill pipe and drilling tool, and providing a hydrostatic head in the well to prevent the uncontrolled escape of gases or liquids from various formations encountered during drilling. The drilling mud also serves to form a lining on the wall of the bore hole which helps to prevent the walls of the bore hole from caving and to plug up permeable formations and thereby prevent the flow of fluid from the well bore outwardly into the permeable formations. The normal procedure during drilling is to circulate the mud down through the interior of the drill pipe and then back up to the surface through the annulus between the drill pipe and the wall of the bore hole. The drilling mud issuing from the well is usually passed over a screen and then through a ditch or trough to a mud pit, to be recirculated through the drill pipe by suitable pumps.

The most common type of drilling mud is essentially a dispersion of a finely divided colloidal material, such as clay, bentonite or the like, in water, together with other materials so that the mud will have the special properties required to perform the several functions enumerated above. Among the properties of the mud that are of principal concern are viscosity, gel strength, and density. The proper density is necessary to furnish sufficient hydrostatic head in the borehole so that the pressure exerted will exceed that of the various fluids encountered in the formations traversed by the borehole. Weighting materials such as silica, iron oxide or barytes, more commonly the latter, are usually added to the drilling mud to provide the proper density. Viscosity and gel strength are imparted by the clay or bentonite component. A typical drilling mud will have a density of from 9 to

2

18 pounds per gallon and in general, for satisfactory drilling will have a viscosity of about 5 to 20 centipoises at 75° F. as measured on the Stormer viscosimeter at 600 R. P. M., although in some deep drilling operations viscosities as high as 60 centipoises may be employed.

It is important that a drilling mud have thixotropic properties, i. e. it should be fluid when subjected to agitation but when standing should set to a gel of sufficient strength to retain cuttings in the time required for the cuttings to settle a few feet. In order to perform the function of carrying cuttings from the drill bit to the earth's surface where the cuttings drop out in the mud pit, the drilling fluid must have a selected viscosity such that the fluid may be pumped through the system and also such that the cuttings will remain suspended in the fluid during the flow of the fluid up the bore hole. Also the fluid, when it is relatively quiescent, should permit the cuttings to fall a few feet since it is essential that the cuttings settle out at the surface. On the other hand, the fluid should have the property of gelling on standing, in order to prevent undue settling of the cuttings in the well itself when drilling and circulation of fluid are temporarily halted.

Another important property of a drilling mud that must be controlled is what is known as its fluid loss, or filtration loss, characteristics. Because of differences in hydrostatic pressure between the drilling mud and the formation being drilled there is a tendency for the liquid component of the mud to enter into the pores of the formation, leaving a solid component behind as a cake on the walls of the bore hole. If the permeability of the formation and the fluid loss properties of the drilling mud are both high, large quantities of the liquid component may be lost from the mud, resulting in the building up of a wall cake which in some instances may become so thick as to interfere seriously with movement of the drill pipe even to the extent of causing the pipe to stick in the hole. Furthermore, if a thick cake is formed over the face of a producing formation, there is danger that it will not be properly cleaned off during the process of completing the well, with the result that the production rate of the well will be seriously impaired. In addition, with high fluid loss rates there may also be damage to the formation from the fluid entering it from the drilling mud. For example, if shales and clays of the type susceptible to hydration are encountered, high fluid loss from an aqueous drilling mud may result in swelling and heaving of these shales and clays which will cause slow drilling rates and even sticking of the drill pipe. Also, swelling of clay particles within a sandy formation may lead to permanent reduction in permeability with a resulting impairment of production rates.

A drilling mud having good viscosity, gel strength and fluid loss properties can be prepared by dispersing the proper amount of bentonite in water. However, when certain salts, particularly those of calcium and magnesium, become dissolved or dispersed in such a drilling mud during use as the result of having encountered strata containing these salts during drilling, the fluid loss properties of the drilling mud are adversely affected. To overcome this it is now frequent practice to add to the drilling mud certain organic materials such as corn starch, wheat flour, gum tragacanth, locust bean gum, gum arabic and the like. The use of starches and gums in drilling muds has a disadvantage in that such materials tend to undergo fermentation or bacterial decomposition. In order to prevent such fermentation, as well as to enhance the promotion of low fluid loss properties when using gums or starches, it has been found advisable to maintain the pH of the drilling mud at least above 10 and preferably above 11 or 11.5. This is usually accomplished by adding caustic soda to the mud. However, it frequently happens that when this is done an undue increase in viscosity of the mud occurs and this must be corrected by adding a viscosity controlling agent such as quebracho. In some instances it is not possible to control the viscosity even with such additives and it is then necessary to thin the mud by adding water which in turn impairs the gel strength of the mud. This calls for further treatment of the mud with other addition agents.

It has thus long been apparent that there is need for a material which can be added to a drilling mud to raise its pH value without at the same time adversely affecting its viscosity. It has now been found, in accordance with the present invention, that alkanolamines, particularly the ethanolamines, will effectively raise the pH of an aqueous drilling mud to its desired value of 11 or more without materially increasing the viscosity of the mud. The alkanolamines that are useful in this invention are those having a total of not more than 15 carbon atoms and having not more than 3 carbon atoms between the hydroxyl group and the amino group in the alkanol radical.

It is believed that this proximity of the hydroxyl and amino groups exerts a stabilizing effect which enables the attainment of the desired pH without causing flocculation of the bentonite or other clay used in the drilling mud. It is not intended however that the invention be limited by any theory as to its mode of operation.

The alkanolamines that are particularly preferred are monoethanolamine, diethanolamine and triethanolamine. Other members of this class that may be employed include propanolamine, dimethylethanolamine, and diethylethanolamine. In general, these alkanolamines will be added to the drilling mud in amounts ranging from about 0.1% to about 10%, and preferably in amounts of about 0.1% to about 5%.

Although other amino compounds will effectively raise the pH of an aqueous drilling mud their use is undesirable because of their tendency to increase the viscosity of the drilling mud to more than a moderate degree. Comparison of the alkanolamines of this invention with other amino compounds in a drilling mud composition was made by means of the following tests. An aqueous slurry containing 4% of bentonite was prepared and was found to have a viscosity of about 5 centipoises at 75° F. as measured by the Stormer viscosimeter at 600 R. P. M. Various concentrations of alkanolamines and of other amino compounds were added to portions of this slurry and the effect on viscosity and pH was measured; the pH value being obtained with a Beckman pH meter, and the viscosity with a Stormer viscosimeter. The results obtained are given in the following table.

| Amine | Percent by Weight | Percent Increase in Viscosity | pH |
| --- | --- | --- | --- |
| Ethanolamine | 0.3 | 25 | 11.0 |
|  | 0.8 | 20 | 11.5 |
| Dimethylethanolamine | 0.3 | 70 | 11.5 |
|  | 0.8 | 80 | 11.5 |
| Diethanolamine | 0.3 | 20 | 10.8 |
|  | 0.8 | 35 | 11.0 |
| Triethanolamine | 0.3 | 20 | 11.0 |
|  | 0.8 | 30 | 11.0 |
|  | 1.5 | 40 | 11.0 |
| Diethylamine | 0.3 | 100 | 11.5 |
|  | 0.8 | 430 | 11.6 |
| Piperidine | 0.3 | 720 | 12.3 |
|  | 0.6 | 720 | 12.2 |

It will be seen that although the alkanolamines caused only a slight increase in viscosity, diethylamine and piperidine both increased the drilling mud viscosity by much larger percentages.

In related tests with a 6 percent aqueous slurry of bentonite, addition of about 0.7% of a n-butyl amine caused a 500 percent increase; addition of about 0.8% of n-amyl amine brought about a 980 percent increase and addition of about 0.5% of dimethyl amine caused a 500 percent increase in viscosity.

Although maintenance of a high pH in drilling muds is of particular benefit for preventing fermentation of starch or gums, it is also often desirable to maintain a high pH to prevent corrosion of drilling equipment. Hence the benefits of this invention extend to all aqueous drilling muds that would ordinarily tend to become unduly thickened when attempting to maintain a high pH by adding sodium hydroxide or other strong alkalies thereto.

It is intended that this invention be limited only by the appended claims and not by the foregoing specific examples.

What is claimed is:

1. A drilling fluid comprising an aqueous suspension of a clay to which has been added sufficient alkanolamine to raise the pH of the composition to at least 10, said alkanolamine being characterized by having a total of not more than 15 carbon atoms and not more 3 carbon atoms between the hydroxyl group and the amino group in the alkanol radical.

2. A drilling fluid according to claim 1 in which the alkanolamine is added in the amount of from about 0.1% to about 10%.

3. A drilling fluid according to claim 1 in which the alkanolamine is selected from the class consisting of monoethanolamine, diethanolamine and triethanolamine.

4. A drilling fluid comprising an aqueous suspension of bentonite and from about 0.1 to about 10% of monoethanolamine.

5. A drilling fluid comprising an aqueous suspension of bentonite and from about 0.1 to about 10% of diethanolamine.

6. A drilling fluid comprising an aqueous suspension of bentonite and from about 0.1 to about 10% of triethanolamine.

7. A drilling fluid comprising an aqueous suspension of bentonite and from about 0.1 to about 10% of dimethyl ethanolamine.

VICTOR G. MEADORS.

REFERENCES CITED

The following references are of record in the file of this patent:

UNITED STATES PATENTS

| Number | Name | Date |
| --- | --- | --- |
| 2,320,009 | Ralston | May 25, 1943 |
| 2,495,255 | Hoehn | Jan. 24, 1950 |
| 2,518,439 | Fischer | Aug. 15, 1950 |

OTHER REFERENCES

Synthetic Organic Chemicals, Carbide and Carbon Chem. Corp., 1945, p. 77.